United States Patent [19]

Otera et al.

[11] Patent Number: 5,204,942
[45] Date of Patent: Apr. 20, 1993

[54] ROBOT CONTROL SYSTEM FOR CONTROLLING A SET OF INDUSTRIAL ROBOTS FOR COOPERATIVE OPERATION

[75] Inventors: Nobuyuki Otera; Toshihiko Nishimura; Toru Takahashi, all of Kobe, Japan

[73] Assignee: Kabushiki Kaisha Kobe Seiko Sho, Kobe, Japan

[21] Appl. No.: 711,724

[22] Filed: Jun. 10, 1991

Related U.S. Application Data

[63] Continuation of Ser. No. 409,774, Sep. 20, 1989, abandoned.

[30] Foreign Application Priority Data

Jan. 10, 1989 [JP] Japan .................................. 1-3088
Jan. 10, 1989 [JP] Japan .................................. 1-3089

[51] Int. Cl.⁵ ..................... G06F 15/46; G05B 19/42
[52] U.S. Cl. ........................................ 395/83; 395/80; 395/90; 901/19
[58] Field of Search .................. 364/513; 395/82, 83, 395/80, 90; 901/19

[56] References Cited

U.S. PATENT DOCUMENTS

| | | | |
|---|---|---|---|
| 4,503,507 | 3/1985 | Takeda et al. | 364/513 |
| 4,514,796 | 4/1985 | Saulters et al. | 364/513 |
| 4,530,062 | 7/1985 | Inaba et al. | 364/513 |
| 4,541,060 | 9/1985 | Kogawa | 364/513 |
| 4,546,443 | 10/1985 | Oguchi et al. | 364/513 |
| 4,586,151 | 4/1986 | Buote | 364/513 |
| 4,595,989 | 6/1986 | Yasukawa et al. | 364/192 |
| 4,698,766 | 10/1987 | Entwistle et al. | 364/474.11 |
| 4,794,513 | 12/1988 | Müller | 364/513 |
| 4,833,624 | 5/1989 | Kuwahara et al. | 364/513 |
| 4,841,431 | 6/1989 | Takagi et al. | 364/474.11 |
| 4,870,592 | 9/1989 | Lampi et al. | 364/468 |
| 4,887,014 | 12/1989 | Kato | 364/513 |
| 4,891,765 | 1/1990 | Hatori et al. | 364/513 |
| 4,896,087 | 1/1990 | Onaga et al. | 364/513 |

FOREIGN PATENT DOCUMENTS

| | | |
|---|---|---|
| 67446 | 12/1982 | European Pat. Off. . |
| 3416227 | 11/1984 | Fed. Rep. of Germany . |
| 62-55710 | 3/1987 | Japan .................................. 395/83 |
| 63-29810 | 2/1988 | Japan .................................. 395/83 |
| 2208553 | 4/1989 | United Kingdom . |

OTHER PUBLICATIONS

1986 International Conference on Industrial Electronics, Control and Instrumentation, Sep. 29–Oct. 3, 1986, Milwaukee, Wis.
US vol. 1, 1986 New York, US pp. 233–237; Motoyasu Nagata "Interprocess Communication for Robot Control" pp. 233–237.

*Primary Examiner*—Allen R. MacDonald
*Assistant Examiner*—George Davis
*Attorney, Agent, or Firm*—Oblon, Spivak, McClelland, Maier & Neustadt

[57] ABSTRACT

A robot control system for sequentially controlling a set of industrial robots for coordinated cooperative operation in accordance with a single general control program. The robot control system comprises a single storage unit storing a single general control program comprising motion instructions for the set of industrial robots, a single reading/compiling unit for separately reading the motion instructions from the storage unit and extracting the motion instructions for each industrial robot, and a plurality of driving units respectively driving the corresponding industrial robots in accordance with the motion instructions. The single general control program facilitates sequentially coordinating motion instructions for controlling the set of industrial robots so that the industrial robots will not interfere each other during the cooperative operation, finding errors in the instructions, and modifying the general control program to cope with changes in the process controlled by the robot control system.

2 Claims, 8 Drawing Sheets

ROBOT CONTROL SYSTEM FOR CONTROLLING A SET OF INDUSTRIAL ROBOTS FOR COOPERATIVE OPERATION

This application is a continuation of application Ser. No. 07/409,774, filed on Sep. 20, 1989, now abandoned.

BACKGROUND OF THE INVENTION

1. Field of the Invention

The present invention relates to a robot control system for controlling a set of industrial robots (hereinafter referred to simply as "robots") for cooperative operation and, more specifically, to a robot control system for controlling a set of robots for cooperative operation according to a single control program.

2. Description of the Prior Art

Figure 7:
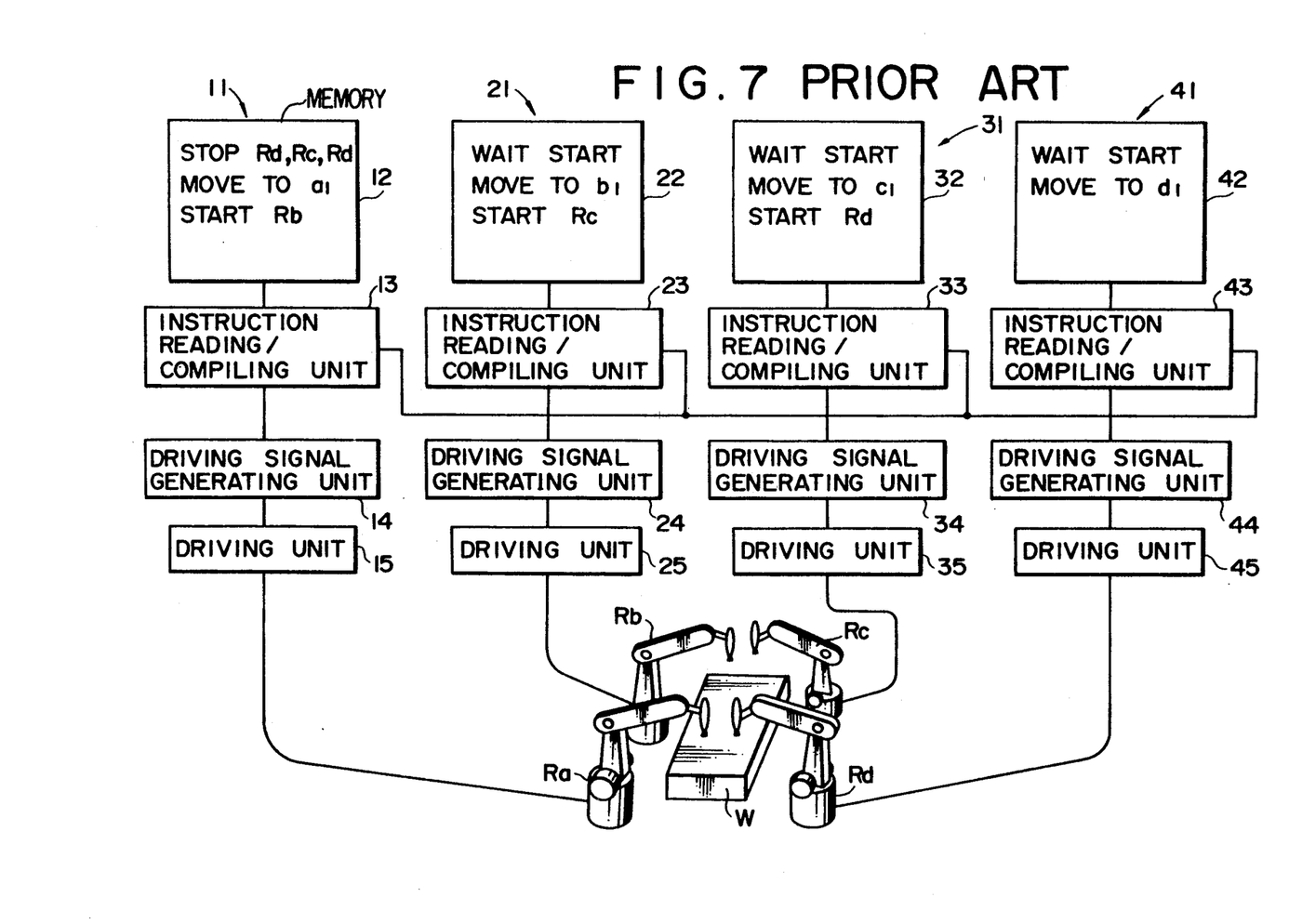
FIG. 7 is a block diagram of a conventional robot control system for controlling a set of robots for cooperative operation.

Referring to FIG. 7, a conventional robot control system for controlling a set of four robots Ra, Rb, Rc and Rd for processing a work W comprises memories 12, 22, 32 and 44, reading/compiling units 13, 23, 33 and 43, instruction executing units 14, 24, 34 and 44, and servomechanisms 15, 25, 35 and 45, respectively, for controlling robots Ra, Rb, Rc and Rd. The reading-/compiling units 13, 23, 33 and 43 are interconnected by a communication line 50 for the cooperative operation of the robots Ra, Rb, Rc and Rd.

Individual control programs for controlling the robots Ra, Rb, Rc and Rd are stored respectively in the memories 12, 22, 32 and 42. The control programs are made so that the robots Ra, Rb, Rc and Rd will not interfere with each other during operation and will operate in a predetermined sequence.

Figure 8:
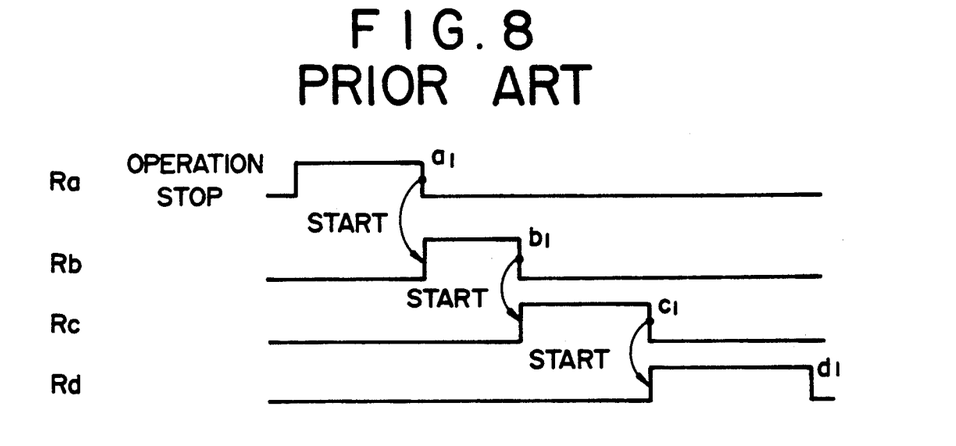
FIG. 8 is a time chart for explaining an example of the cooperative operation of the set of robots under the control of the robot control system of FIG. 7.

When the robots Ra, Rb, Rc and Rd are operated sequentially one at a time as shown in FIG. 8, each of the control programs includes communication instructions, such as STOP, START and WAIT, for communication between the robots Ra, Rb, Rc and Rd in addition to an operation instruction, such as MOVE TO.

In such a conventional robot control system for controlling a plurality of robots for cooperative operation, a position is expressed in the program by a coordinate system which is individual for the corresponding robot. Therefore, it is difficult to determine respective positions of the robots relative to each other, and hence it is difficult to make programs capable of satisfactorily controlling the robots for cooperative operation and avoiding collision between the robots.

Furthermore, since the programs are made individually for the robots, it is difficult to realize the relation between the actions of the robots from the programs and hence it is difficult to find errors in the programs and to correct the programs.

Figure 9:
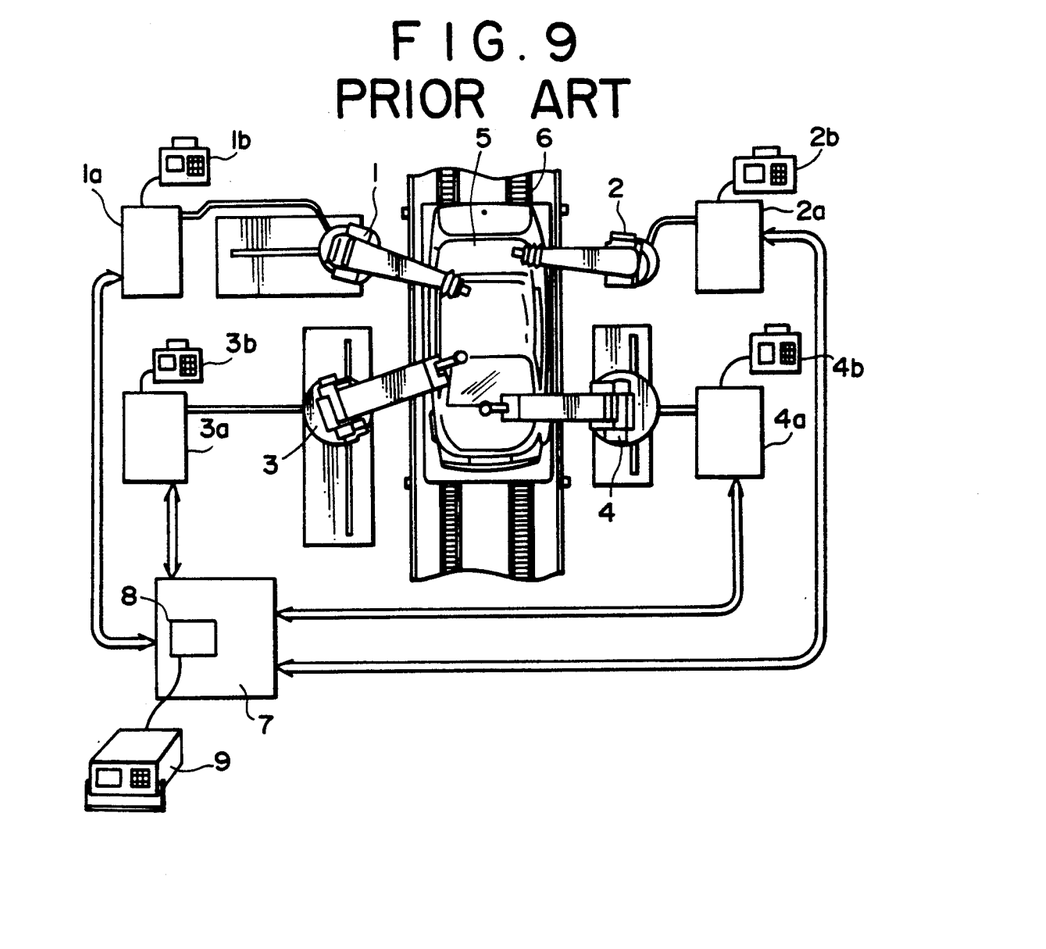
FIG. 9 is an illustration of another conventional robot control system.

FIG. 9 shows another conventional robot control system for controlling four robots Ra, Rb, Rc and Rd for cooperative operation to process a work W. The robot control system comprises a system controller 7, robot controllers 1a, 2a, 3a and 4a respectively for controlling the robots Ra, Rb, Rc and Rd, connected to the system controller 7, teaching units 1b, 2b, 3b and 4b connected respectively to the robot controllers 1a, 2a, 3a and 4a to teach the robots Ra, Rb, Rc and Rd, and a sequence program input unit 9 connected to the system controller 7 to give an actuating sequence control program to the system controller 7. Control programs are stored respectively in the memories of the robot controllers 1a, 2a, 3a and 4a to control the robots Ra, Rb, Rc and Rd for a series of operations. Also connected to and controlled by the system controller 7 are auxiliary equipment including a conveyor 6 for conveying the work W, a positioning device for positioning the work 1, chucking mechanisms, safety mechanisms, and interlocking mechanisms for avoiding interference between the robots Ra, Rb, Rc and Rd. A sequence controller 8 included in the system controller 7 controls the robots Ra, Rb, Rc and Rd and the auxiliary equipment for sequential operation.

This conventional robot control system requires the robot controllers and the teaching units individually for the plurality of robots, and must teach operating procedures individually to the plurality of robots every time the contents of process changes. The system controller provided in addition to the robot controllers increases the floor space necessary for installing the robot control system.

Furthermore, complicated wiring to interconnect the robots and the robot controllers, and the robot controllers and the system controller for controlling the robots for coordinated cooperative operation requires much time for designing and installing the wiring.

When the work is changed or modified requiring changing the robots and the auxiliary equipment, the modification of the machining system and the robot control system, and teaching new motions to the robots require much time.

Figure 10:
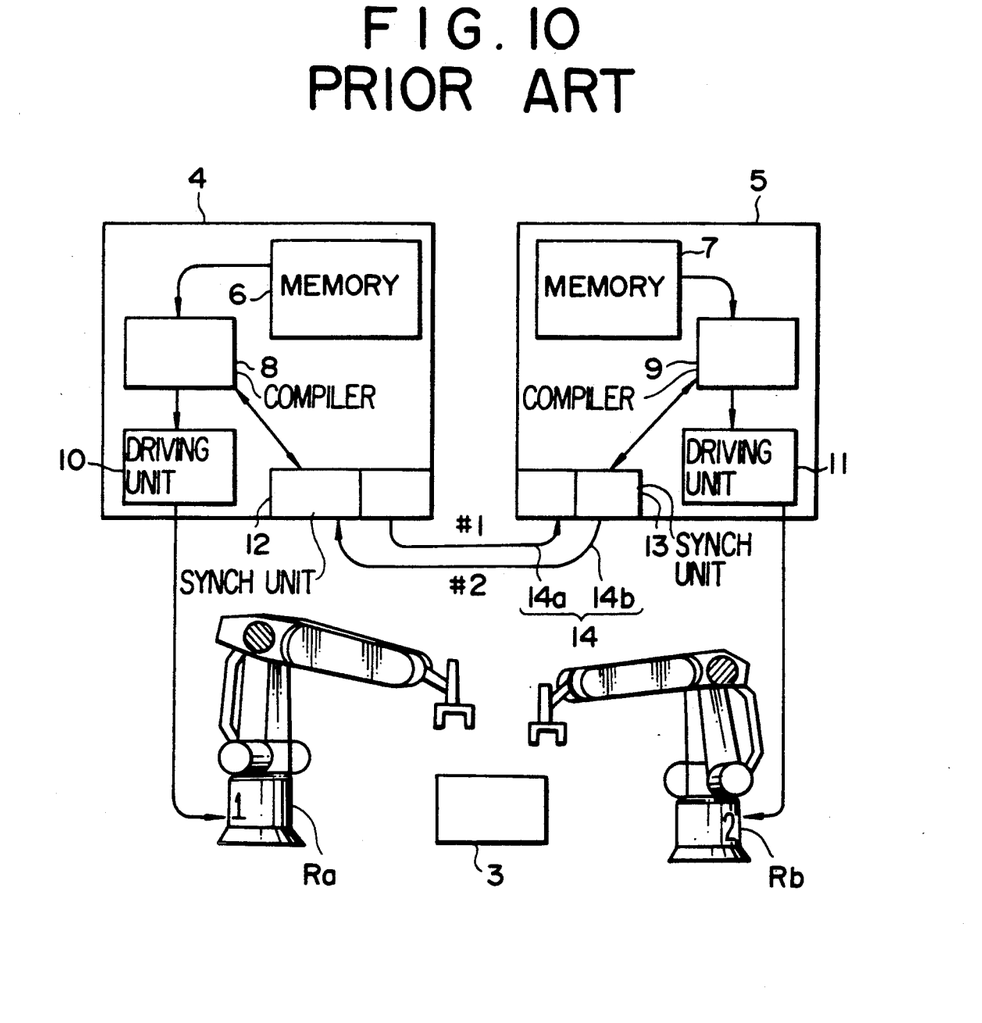
FIG. 10 is a block diagram of a third conventional robot control system.

FIG. 10 shows a third conventional robot control system for controlling two robots Ra and Rb for cooperative operation to process a work W. The robot control system comprises two robot controllers 4 and 5 respectively for controlling the robots Ra and Rb.

The robot controller 4 (5) comprises a memory 6 (7), an instruction compiler 8 (9), a driving unit 10 (11), and a synchronizing unit 12 (13). The synchronizing units 12 and 13 of the robot controllers 4 and 5 are interconnected by an external communication cable 14 to control the robots Ra and Rb for synchronous operation. Individual control programs for controlling the robots Ra and Rb are stored respectively in the memories 6 and 7. The control programs must be designed to control the robots Ra and Rb for predetermined sequential operation so that the robots will not interfere with each other.

In executing the control programs, contact inputs and outputs are transmitted through the external communication cable 14 between the synchronizing units 12 and 13.

Examples of the control programs for controlling the robots Ra and Rb include the following instructions.

Control Program for the Robot Ra:
MOVE TO $P_1$
OUT #1, ON
WAIT UNTIL #2=ON
MOVE TO $P_3$ Control Program for the Robot Rb:
WAIT UNTIL #1=ON
MOVE TO $P_2$
OUT #2, ON According to these instructions, the robot Rb starts to operate upon the arrival of the robot Ra at a set position $P_1$, while the robot Ra remains in a standby state until the robot Rb arrives at a set position $P_2$. Upon the arrival of the robot Rb at the set position $P_2$, the robot Ra moves to a set position $P_3$. A signal indicating the arrival of the robot Ra at the set position $P_1$ is transmitted through a line 14a of the external communication cable 14, and a signal indicating the arrival of the robot Rb at the set position P2 is transmitted through a line 14b of the external communication cable 14.

Thus, this conventional robot control system needs the external communication cable 14 and the synchronizing units 12 and 13 for communication between the robot controllers 4 and 5 to control the robots Ra and Rb for synchronous operation. The external communication cable 14 must have an increased number of lines for specific purposes to transmit increased amount of information between the robot controllers 4 and 5. Accordingly, the robot control system is expensive, and the modification of the robot control system for adaptation to different processes is difficult.

SUMMARY OF THE INVENTION

Accordingly, it is an object of the present invention to provide a robot control system capable of controlling a set of robots for coordinated cooperative operation by using a single control program.

It is another object of the present invention to provide a robot control system capable of controlling a set of robots for cooperative operation by controlling the sequential execution of instructions included in unit motion control programs prepared respectively for the robots to control the robots for the sequential execution of set unit motions, and capable of being readily modified according to the modification of the controlled system.

It is a further object of the present invention to provide a robot control system for controlling a set of robots for cooperative operation, capable of internally transmitting or receiving information between the robots without requiring any external communication means, capable of readily coping with requirement for increasing the transmitting or receiving information capacity and changes in the controlled system, and capable of being manufactured at a comparatively low cost.

In one aspect of the present invention, a robot control system for controlling a set of robots for cooperative operation comprises storage means for storing a single general control program comprising actuating instructions for the set of robots, reading/compiling means for reading actuating instructions from the multiple unit control program and separately extracting actuating instructions for each robot, and a plurality of executive means for driving the corresponding robots according to the actuating instructions.

This robot control system stores a single general control program in a single storage means, and a single instruction reading/compiling means extracts actuating instructions separately from the general control program. Accordingly, instructions for the required motions of the robots can be easily described in the general control program taking into account the coordinated cooperative motions of the robots.

The description of set positions by a world coordinate system facilitates the recognition of the positions of the robots relative to each other and enables the examination of the capability of avoiding interference between the robots of the general control program in organizing the general control program. Furthermore, the use of a single control program for controlling a plurality of robots facilitates recognizing the relation between the motions of the robots, finding errors in the control program, and correcting the errors.

In a second aspect of the present invention, a robot control system for controlling a set of robots for cooperative operation comprises a first storage means for storing a general control program for collectively controlling the sequence of the unit motions of the robots, instruction reading/compiling means for reading the instructions included in the general control program from the first storage means and providing actuating instruction signals according to the sequence of the unit motions of the robots, a plurality of second storage means each for storing a unit motion control program including detailed unit motion instructions for the corresponding robot, and a plurality of control means for controlling the corresponding robots according to the unit motion control programs stored in the second storage means.

This robot control system controls the sequence of execution of the unit motions of the robots defined by motion instructions included in the unit motion control programs stored in the second storage means according to the general control program stored in the first storage means.

Accordingly, robot controllers respectively for the robots are comparatively simple and compact in construction, and the robot controllers need not be provided with any teaching unit. Furthermore, when the work is changed or the auxiliary equipment is modified, the robot control system can be adapted to the change by changing only the host program stored in the first storage means.

In a third aspect of the present invention, a robot control system for controlling a set of robots for cooperative operation comprises storage means for storing actuating instructions for the set of robots, instruction reading/compiling means for reading the actuating instructions from the storage means and compiling the same, internal communication means for exchanging information representing the operating states of the robots between the instruction reading/compiling means according to instructions read from the storage means by the instruction reading/compiling means, and driving means for driving the corresponding robots according to the actuating instructions and the information representing the operating states of the robots.

In this robot control system, the storage means stores actuating instructions for the robots, the instruction reading/compiling means reads and compiles the actuating instructions for the robots, the internal communication means enables the instruction reading/compiling means exchange information representing the operating states of the robots according to the actuating instructions read from the storage means by the instruction reading/compiling means, and then the robots are driven according to the corresponding actuating instructions and the information representing the operating states of the robots.

The internal communication means is the intertask communication function of an operating system when the robot control system has a single robot controller for controlling a set of robots. When the robot control system has robot controllers respectively for the robots, the internal communication means is a memory connected to the robot controllers as an area for common messages.

BRIEF DESCRIPTION OF THE DRAWINGS

The above and other objects, features and advantages of the present invention will become more apparent from the following description taken in conjunction with the accompanying drawings, in which.

DETAILED DESCRIPTION OF THE PREFERRED EMBODIMENTS

Figure 1:
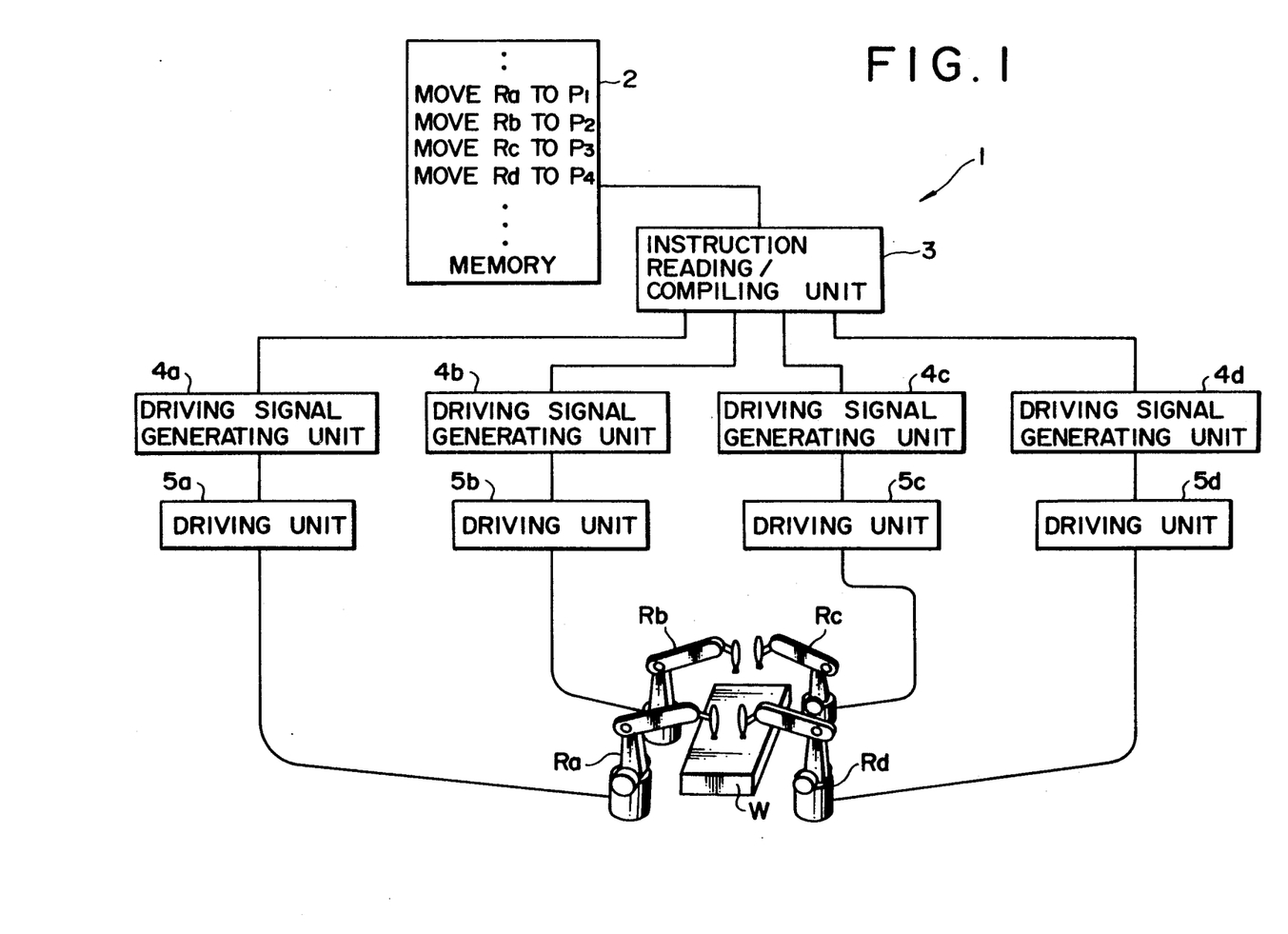
FIG. 1 is a block diagram of a robot control system for controlling a set of robots for cooperative operation, in a first embodiment according to the present invention.

Referring now to the drawings, wherein like reference numerals designate identical or corresponding parts throughout the several views, in FIG. 1, a robot control system 1 in a first embodiment according to the present invention controls four robots Ra, Rb, Rc and Rd for cooperative operation. The robot control system 1 comprises a memory 2, an instruction reading/compiling unit 3, driving signal generating units 4a, 4b, 4c and 4d respectively for the robots Ra, Rb, Rc and Rd, and driving units 5a, 5b, 5c and 5d respectively for driving the robots Ra, Rb, Rc and Rd.

A general control program including actuating instructions for the four robots Ra, Rb, Rc and Rd is stored in the memory 2. Examples of the instructions described in the general control program are:

MOVE Ra TO $P_1$
MOVE Rb TO $P_2$
MOVE Rc TO $P_3$
MOVE Rd TO $P_4$

The instruction "MOVE Ra TO $P_1$", for example, signifies moving the effector of the robot Ra to a position $P_1$ designated by a world coordinate system.

The reading/compiling unit 3 reads the general control program and extracts actuating instructions for each robot separately. That is, the reading/compiling unit 3 extracts a robot identifier and the contents of motions for each robot, and then gives the contents of motions to the corresponding robot. The position designated in the actuating instruction by the world coordinate system is converted into a position designated by a coordinate system peculiar to each robot.

Basically, the driving signal generating units 4a, 4b, 4c and 4d are the same in constitution and function as those employed in the conventional robot control system. The driving signal generating units 4a, 4b, 4c and 4d give driving signals in accordance with the actuating instructions given thereto.

The driving units 5a, 5b, 5c and 5d are the same in constitution and function as those employed in the conventional robot control system.

Figure 2:
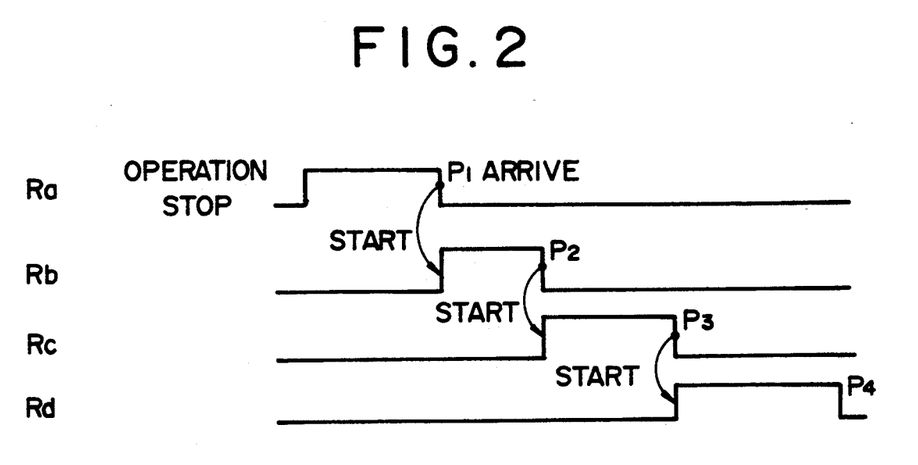
FIG. 2 is a time chart for explaining an example of the cooperative operation of a set of robots under the control of the robot control system of FIG. 1.
Figure 3:
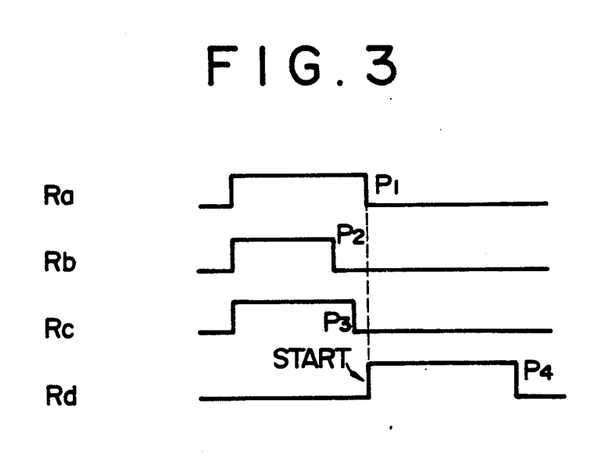
FIG. 3 is a time chart, similar to FIG. 2, for explaining another example of the cooperative operation of the set of robots under the control of the robot control system of FIG. 1.

Referring to FIG. 2, when the general control program is executed, the robots Ra, Rb, Rc and Rd move sequentially to positions $P_1$, $P_2$, $P_3$ and $P_4$ respectively. When an instruction:

CO-MOVE Ra TO $P_1$
Rb TO $P_2$
Rc TO $P_3$
MOVE Rc TO $P_4$ signifying simultaneously moving the robots Ra, Rb and Rc respectively to positions $P_1$, $P_2$ and $P_3$ designated by the world coordinate system and, subsequently, moving the robot Rd to a position $P_4$ designated by the world coordinate system, is executed, the robots Ra, Rb and Rc move simultaneously to the positions $P_1$, $P_2$ and $P_3$ respectively, and then the robot Rd moves to the position $P_4$ as shown in FIG. 3.

Thus, the robot control system 1 controls the four robots Ra, Rb, Rc and Rd by executing the single general control program without requiring any communication instruction. Since the positions are designated by the world coordinate system, the general control program can be easily organized taking into account the cooperative operations of the four robots Ra, Rb, Rc and Rd.

Furthermore, having the single memory 2 and the single reading/compiling unit 3, and needs no communication line, the robot control system 1 is simple in constitution.

Still further, since the relation between the respective actions of all the robots can be understood from the single general control program, errors in the general control program can be easily found and corrected.

In a modification, the general control program may designate positions by coordinate systems peculiar to the robots Ra, Rb, Rc and Rd respectively.

Figure 4:
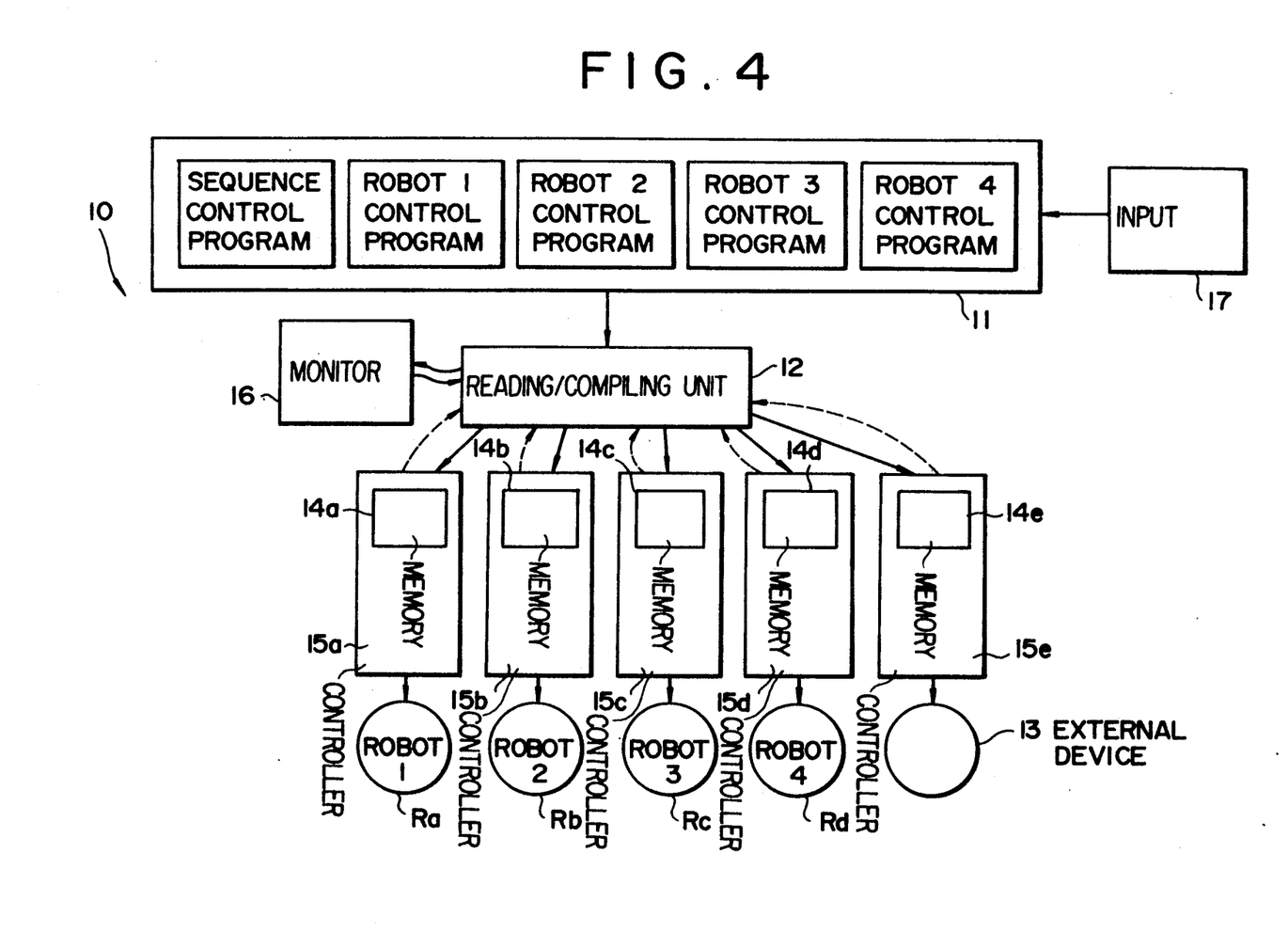
FIG. 4 is a block diagram of a robot control system for controlling a set of robots for cooperative operation, in a second embodiment according to the present invention.

A robot control system 10 in a second embodiment according to the present invention shown in FIG. 4 controls, for example, four robots Ra, Rb, Rc and Rd. The robot control system 10 comprises a first memory 11, a reading/compiling unit 12, second memories 14a, 14b, 14c, 14d and 14e respectively for the four robots Ra, Rb, Rc and Rd and external devices 13 including a conveyor and positioning devices, controllers 15a, 15b, 15c, 15d and 15e respectively for the robots Ra, Rb, Rc and Rd and the external devices, and a monitor 16.

The first memory 11 stores a series of user programs for the general control of execution sequence of unit motions of the four robots Ra, Rb, Rc and Rd and the external devices 13. The user programs are given to the first memory 11 by a single program input device 17. The user programs include instructions of a basic composition associated with a series of host working systems, and the instructions are identified by identifiers corresponding to the robots Ra, Rb, Rc and Rd and the external devices.

The reading/compiling unit 12 reads the user programs from the first memory 11 and gives actuating instructions to the controllers 15a, 15b, 15c, 15d and 15e according to the predetermined sequence of execution. The user programs are identified by the identifiers and given to the controllers 15a, 15b, 15c, 15d and 15e in an appropriate sequence.

The second memories 14a, 14b, 14c, 14d and 14e store unit motion programs respectively for the robots Ra, Rb, Rc and Rd and the external devices 13. Each unit motion program includes instructions designating basic unit motions of the the corresponding robot, such as linearly moving the effector of the corresponding robot to a set position. Accordingly, the unit motion program need not be changed even if the work is changed or the external devices 13 are modified or changed, except when the corresponding robot is changed for another. When such changes are made, only the user program relating to a series of working systems stored in the first memory 11 needs to be changed.

The controllers 15a, 15b, 15c, 15d and 15e respectively for controlling the robots Ra, Rb, Rc and Rd and the external devices 13 give driving signals to the corresponding robots Ra, Rb, Rc and Rd and the external devices 13 according to output instruction signals given thereto by the reading/compiling unit 12 and the unit motion programs stored in the second memories 14a, 14b, 14c, 14d and 14e. Each controller executes a control operation in accordance with the contents of the instruction given thereto and, upon the completion of the control operation, gives an operation completion signal to the reading/compiling unit 12. Thus, only a motion instruction signal and an operation completion signal are exchanged for every execution of a motion between the reading/compiling unit 12 and each controller. Upon the reception of the operation completion signal, the reading/compiling unit 12 reads the next instructions from the user programs according to the sequence of execution and gives instruction signals to the controllers 15a, 15b, 15c, 15d and 15e.

The monitor 16 monitors the operation of the robots Ra, Rb, Rc and Rd and the external devices 13 so that the robots Ra, Rb, Rc and Rd and the external devices 13 will operate for cooperative operation without interfering each other. A memory included in the monitor 16 is allocated for the robots Ra, Rb, Rc and Rd and the external devices 13 to store data signifying the operating states of the robots Ra, Rb, Rc and Rd and the external devices 13. The reading/compiling unit 12 gives actuation instruction signals to the controllers 15a, 15b, 15c , 15d and 15e according to the user programs always referring to the contents of the memory of the monitor 16. Consequently, interlocked operation of the robots Ra, Rb, Rc and Rd, and conditional branching can be very easily controlled.

Thus, the robot control system 10 controls and drives the robots Ra, Rb, Rc and Rd and the external devices 13 by the reading/compiling unit 12 for sequential operation on the basis of the host user programs stored in the first memory 11. Since the reading/compiling unit 12 is actuating instruction signals to the controllers 15a, 15b, 15c, 15d and 15e is always referring to the contents of the monitor 16, the robots Ra, Rb, Rc and Rd and the external devices 13 are able to operate for cooperative operation without interfering each other.

The unit motion programs stored in the second memories 14a, 14b, 14c, 14d and 14e are simple in composition, because they need not be changed even if the work and/or the auxiliary devices are changed. Since the controllers 15a, 15b,15c, 15d and 15e need not be provided with any teaching unit, the robot control system 10 is simple in construction. Furthermore, the working system can be comparatively simply changed, because only the user programs stored in the first memories 11 needs to be changed when the work and/or the auxiliary devices are changed.

The reading/compiling unit 12 and the controllers 15a, 15b, 15c, 15d and 15e may be separate microprocessors respectively or may be substituted by a single multiple-function microprocessor.

If the robots Ra, Rb, Rc and Rd are the same or analogous types, it is possible to routinize a portion of the user programs stored in the first memory 11 to use the routinized portion in common for all the robots.

Figure 5:
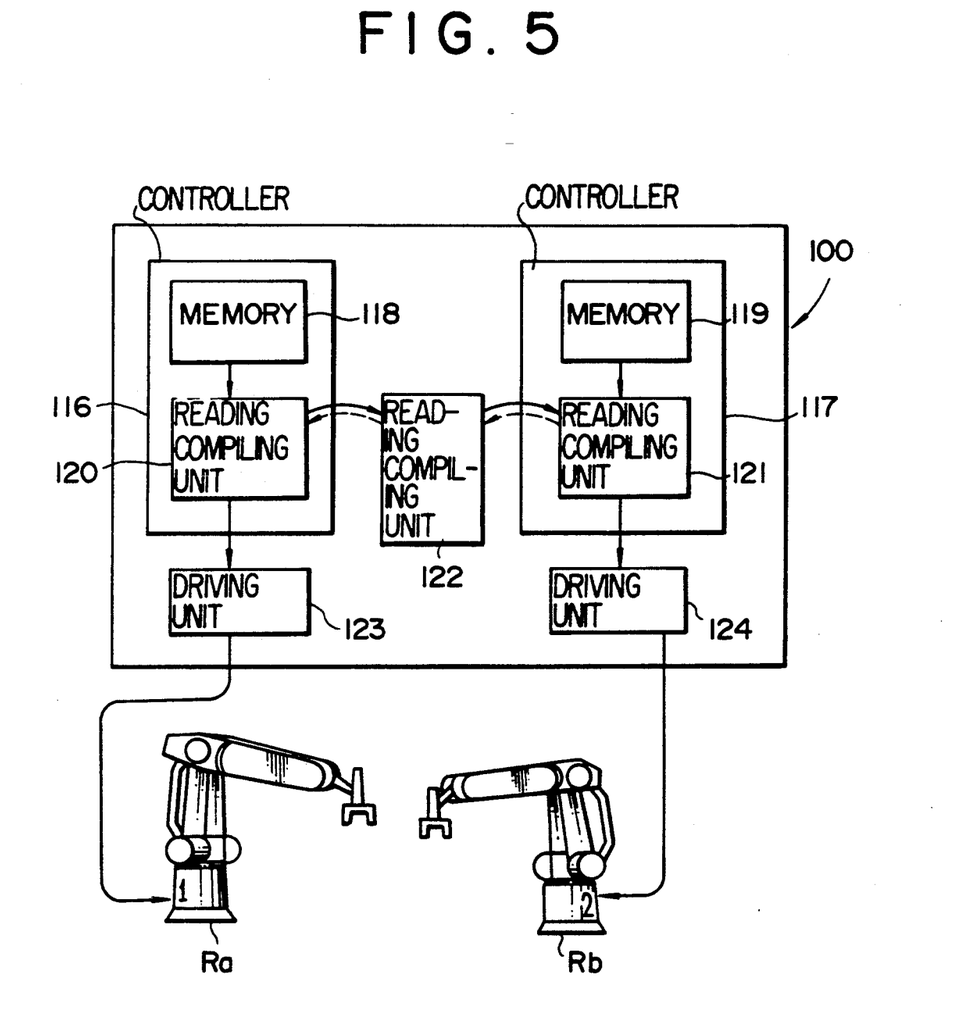
FIG. 5 is a block diagram of a robot control system for controlling a set of robots for cooperative operation, in a third embodiment of the present invention.

A robot control system 100 in a third embodiment according to the present invention shown in FIG. 5 executes control programs for two robots in accordance with an operating system to control the two robots Ra and Rb for coordinated cooperative operation in a multiple-activity process. This operating system functions as communication means for exchanging messages, namely, information representing the operating states of the robots between the robot control processes.

Referring to FIG. 5, the robot control system 100 comprises two separate robot controllers 116 and 117 respectively for controlling the two robots Ra and Rb, an internal communication unit 122, and two driving units 123 and 124 respectively for driving the robots Ra and Rb. The robot controller 116 (117) comprises a memory 118 (119) for storing a first user program (a second user program) for the robot Ra (Rb), and a reading/compiling unit 120 (121) including a CPU.

The read/compiling units 120 and 121 read motion instructions from the memories 118 and 119 and compile the motion instructions. The CPUs of the reading-/compiling units 120 and 121 are interconnected by a common bus. Information representing the operating states of the robots Ra and Rb is exchanged through the internal communication unit 122 between the reading-/compiling units 120 and 121 according to the contents of instructions read from the memories 118 and 119 by the reading/compiling units 120 and 121. The internal communication unit 122 has a common memory accessible to the reading/compiling units 120 and 121 as a message area particularly for communication. If the control processes for the robots Ra and Rb are processed by a common reading/compiling unit, it is possible to substitute the memory of the internal communication unit 122 by a program for operating the intertask communication function of the operating system.

Basically, the driving units 123 and 124 are the same in function as servo drivers employed in the conventional robot control system. The driving units 123 and 124 drive the corresponding robots Ra and Rb in accordance with the motion instructions and the information indicating the operating states of the robots Ra and Rb.

Figure 6:
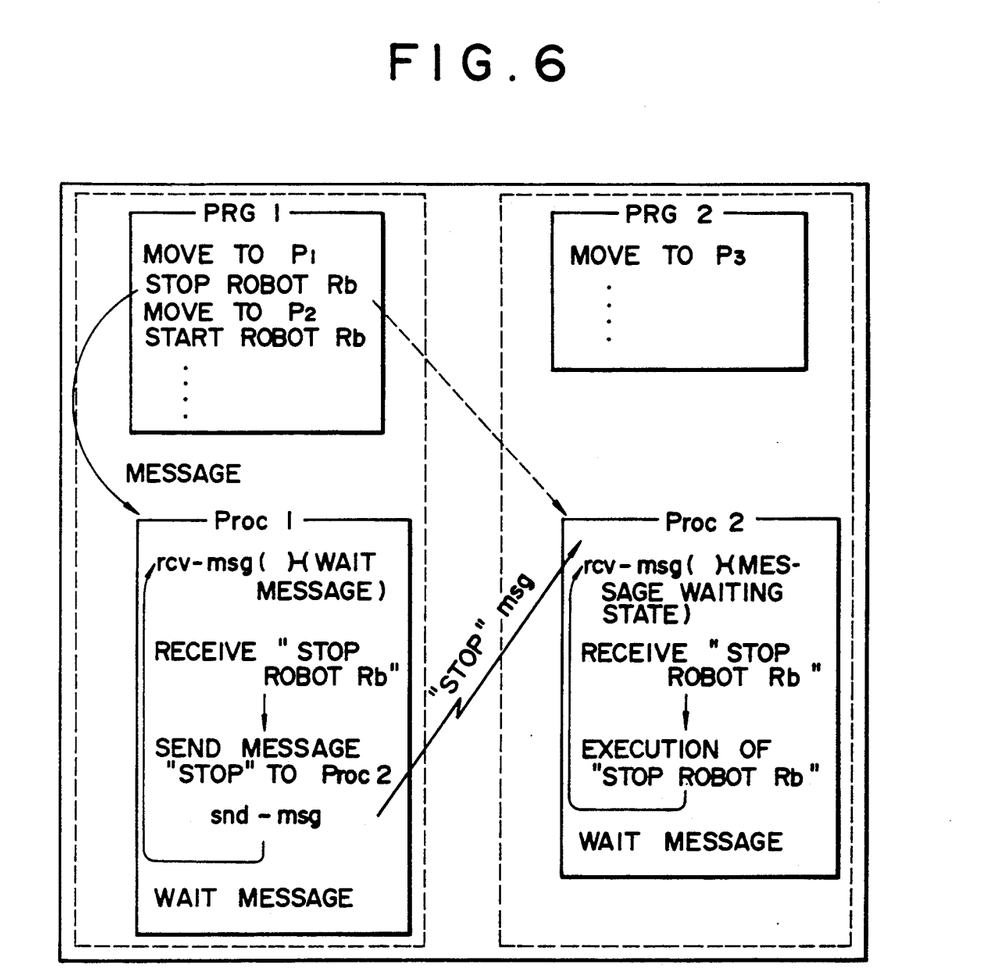
FIG. 6 is an illustration for explaining an example of a control program to be executed by the robot control system of FIG. 5.

FIG. 6 shows an example of the control program to be executed by the robot control system 100 to control the robots Ra and Rb for coordinated cooperative operation. In FIG. 6, Proc 1, Proc 2, PRG1 and PRG2 denote a control process for controlling the robot Ra, a control process for controlling the robot Rb, a user program for the robot Ra, and a user program for the robot Rb, respectively. The control processes Proc 1 and Proc 2 are executed in accordance with the contents of the messages. Every other control process is able to transmit the messages.

When the user program PRG1 is executed to move the robot Ra to a set position $P_1$ and a message "STOP"

to stop the robot Rb is transmitted to the control process Proc 1, the control process Proc 1 transmits the message "STOP" to the control process Proc 2 to stop the robot Rb. The message "STOP" may be transmitted directly from the user program PRG1 to the control process Proc 2 as indicated by a broken line.

Thus, the robot control system 100 enables internally exchanging information between the robots without requiring any external communication means.

Although the invention has been described in its preferred forms with a certain degree of particularity, obviously many changes and variations are possible therein. It is therefore to be understood that the present invention may be practiced otherwise than as specifically described herein without departing from the scope and spirit thereof.

What is claimed is:

1. A robot control system for controlling a plurality of industrial robots for cooperative operation on a workpiece at the same time, comprising:
   means for preventing said robots from interfering with each other while moving including a single storage means storing a general program comprising instructions for actuating said industrial robots, the movement of said robots being established in world coordinates so that interference between robots is avoided;
   a single reading/compiling means for reading the instructions and separately extracting the instructions for each industrial robot; and
   a plurality of driving signal generating units and a plurality of driving units respectively for driving the industrial robots according to the instructions, so that said plurality of robots may move simultaneously by the execution of a single general control program.

2. A robot control system for controlling a plurality of industrial robots for cooperative operation on a workpiece at the same time, comprising:
   means for preventing said robots from interfering with each other while moving including a first storage means storing a series of general control programs for generally controlling a sequence of execution of motions of said industrial robots, the movement of said robots being established in world coordinates so that interference between robots is avoided;
   a single reading/compiling means reading the series of general control programs and providing instructions designating the sequence of operations of each industrial robot;
   a plurality of second storage means respectively storing motion control programs for the industrial robot; and
   a plurality of executive means respectively for driving the industrial robots according to the instructions provided by the reading/compiling means and motion control programs stored in the second storage means.

* * * * *